United States Patent
Heenan et al.

(10) Patent No.: US 12,224,410 B2
(45) Date of Patent: Feb. 11, 2025

(54) MAGNETIC FLUX GENERATOR

(71) Applicant: Gaussion Ltd, London (GB)

(72) Inventors: Thomas Heenan, Swansea (GB); Chun Tan, London (GB)

(73) Assignee: Gaussion Ltd, London (GB)

( * ) Notice: Subject to any disclaimer, the term of this patent is extended or adjusted under 35 U.S.C. 154(b) by 0 days.

(21) Appl. No.: 18/424,329

(22) Filed: Jan. 26, 2024

(65) Prior Publication Data

US 2024/0258592 A1    Aug. 1, 2024

(30) Foreign Application Priority Data

Jan. 27, 2023 (GB) .................................. 2301222

(51) Int. Cl.
*H01M 10/44* (2006.01)
*H01M 10/46* (2006.01)
*H02J 7/00* (2006.01)

(52) U.S. Cl.
CPC ........... *H01M 10/44* (2013.01); *H01M 10/46* (2013.01); *H02J 7/00308* (2020.01); *H02J 7/0045* (2013.01); *H02J 7/007182* (2020.01)

(58) Field of Classification Search
CPC .............................. H01M 10/44; H01M 10/46
See application file for complete search history.

(56) References Cited

U.S. PATENT DOCUMENTS

| | | | |
|---|---|---|---|
| 2009/0274935 A1* | 11/2009 | Kikuchi | H01M 8/04119 429/430 |
| 2017/0117101 A1 | 4/2017 | Matsuura et al. | |
| 2020/0083513 A1* | 3/2020 | Lejosne | H01M 10/613 |
| 2022/0093981 A1 | 3/2022 | Heenan et al. | |

FOREIGN PATENT DOCUMENTS

| | | |
|---|---|---|
| CN | 102832421 A | 12/2012 |
| CN | 111048842 A | 4/2020 |
| CN | 112530741 A | 3/2021 |
| EP | 3033796 A1 | 6/2016 |
| GB | 201900171 A | 1/2019 |
| JP | 2018026424 A | 2/2018 |
| WO | 2020144142 A1 | 1/2019 |

OTHER PUBLICATIONS

International Search Report and Written Opinion received for PCT Patent Application No. PCT/EP2024/051976, mailed on Apr. 25, 2024, 10 pages.

* cited by examiner

*Primary Examiner* — Olatunji A Godo
(74) *Attorney, Agent, or Firm* — ARENTFOX SCHIFF LLP

(57) ABSTRACT

The invention provides a magnetic flux generator to enhance ion transport in an electrochemical cell. The magnetic flux generator comprises one or more magnetic field sources, each being configured to produce a respective magnetic field. Each magnetic field is individually controllably variable in three spatial dimensions.

15 Claims, 11 Drawing Sheets

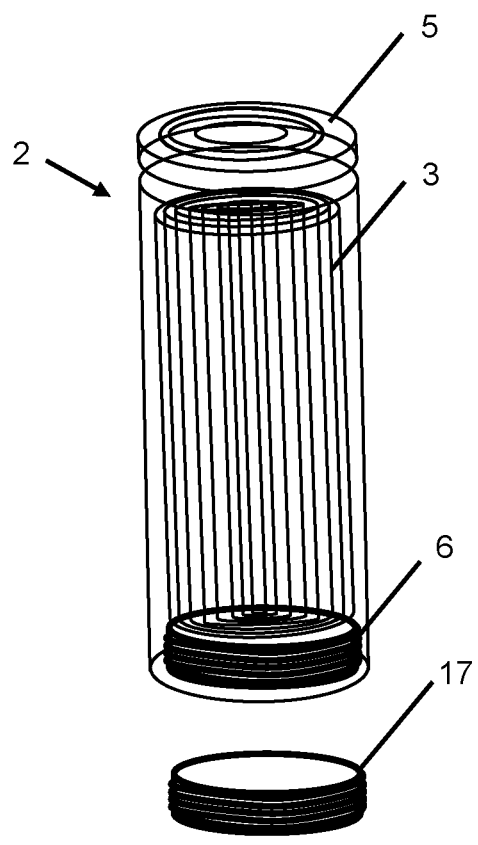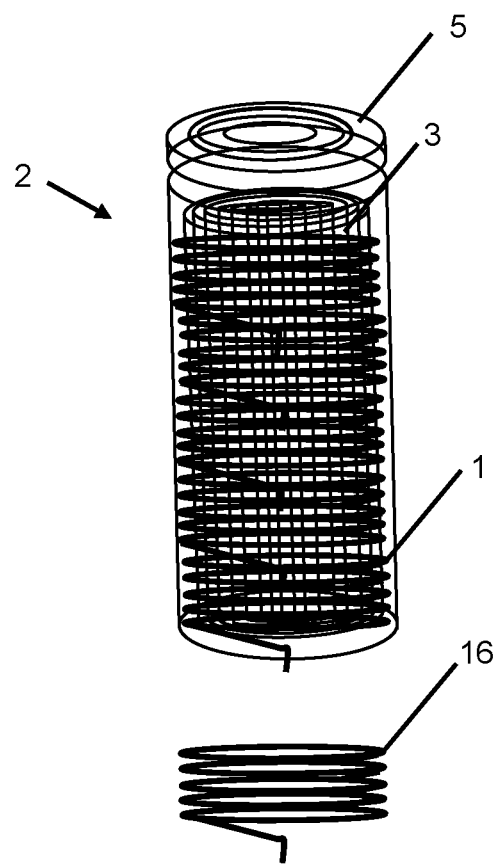
FIG. 7A
FIG. 7B

MAGNETIC FLUX GENERATOR

CROSS-REFERENCE TO RELATED APPLICATIONS

This application claims foreign priority to GB Patent Application No. 2301222.2, entitled "MAGNETIC FLUX GENERATOR", filed on Jan. 27, 2023, which is expressly incorporated by reference herein in its entirety.

FIELD OF THE INVENTION

The present invention relates to a magnetic flux generator, and particularly, although not exclusively, to a magnetic flux generator to enhance ion transport in an electrochemical cell.

BACKGROUND

Electrochemical cells are vital to many electrical systems, in particular portable devices such as mobile phones and laptops and, increasingly, electric vehicles.

The portability of electronic devices/vehicles is dependent upon the performance of their cells. In general, it is desirable to have a cell that has a large capacity and a short charging time to increase the ratio of time that the devices/vehicles can operate independently of an external power source to time that they must be connected to an external power source for charging.

Various types and configurations of electrochemical cells can be selected based on size, shape, voltage, current and other requirements. Examples of common shapes of cells are pouch cells, prismatic cells, cylindrical cells, Swagelok cells and coin cells. The cells may also be connected in a battery to provide the appropriate voltage and/or current for the application.

If a cell is charged too quickly, many undesirable operation conditions can occur, such as: dendrite formation, metallic plating and current hot-spots, each of which can potentially increase the likelihood of a short circuit and damage to the cell. A common method of quickly charging a cell while avoiding over-charging is to supply a constant current in a first charging phase until a predetermined voltage is reached in the cell and then, in a second charging phase, holding the voltage constant while the current decays to ensure the cell reaches capacity. The first charging phase quickly increases the charge in the cell and the second charging phase is slower.

It is known that the provision of a changing magnetic field through an electrochemical cell can enhance the cell's performance (see GB 201900171 A). However, the present invention addresses the technical challenges associated with the control and implementation of this concept.

The present invention has been devised in light of the above considerations.

SUMMARY OF THE INVENTION

The present invention provides a magnetic flux generator to enhance ion transport in an electrochemical cell, the magnetic flux generator comprising:
  one or more magnetic field sources, each being configured to produce a respective magnetic field;
  wherein each magnetic field is individually controllably variable in three spatial dimensions.

Generally, applying a changing magnetic field which is variable in the three spatial dimensions through an electrochemical cell means that the direction of the magnetic flux in the cell varies over time. This enhances the ion transport within the cell and can consequently improve the cell's speed of charging and/or discharging, as well as the capacity of the cell.

The magnetic flux generator of the present invention generates a total changing magnetic field which is provided by the one or more magnetic fields together. Placing an electrochemical cell in the total changing magnetic field or in a selected subsection of the one or more magnetic fields can enhance the cell's ion transport. Advantageously, individually and controllably varying each magnetic field in the three spatial dimensions allows precise and accurate control of the changes in the magnetic flux through the electrochemical cell. This ensures that the enhancement of ion transport in the cell can be optimised.

Optional features of the invention are discussed below. The invention includes the combination of the aspects and optional features described except where such a combination is clearly impermissible or expressly avoided.

In addition to the three spatial dimensions, the polarity and/or magnitude of each magnetic field may also be varied to vary the distribution and/or magnitude of the total changing magnetic field.

Optionally, each magnetic field is individually controllably varied over time continuously or incrementally. For example, each magnetic field may have sine waveform function or a step waveform function.

Optionally, each magnetic field is individually controllably varied to be pulsed, rotating, and/or oscillating. Rotation of each magnetic field may be around an axis having a component perpendicular to a direction of the respective magnetic field. The rotation of each magnetic field may be around an axis having a component parallel to a direction of the respective magnetic field. Rotation of each magnetic field may be around an axis having a component perpendicular to a direction of current flow within the electrochemical cell. The rotation of each magnetic field may be around an axis having a component parallel to a direction of current flow of the electrochemical cell. Each rotating magnetic field may be provided by a rotating permanent magnet, or a temporary magnet, or an electromagnet or may be provided by an array of electromagnets which are sequentially activated to effectively rotate the respective magnetic field.

Optionally, the one or more magnetic field sources is a plurality of magnetic field sources. In this case, the total changing magnetic field generated by the magnetic flux generator is provided by the plurality of changing magnetic fields generated by the plurality of magnetic field sources.

Optionally, the plurality of magnetic field sources are arranged in a common plane. For example, the magnetic flux generator may comprise a planar (i.e. flat) mechanical support configured to support the plurality of magnetic field sources. The magnetic field sources may be arranged in an array or a grid. Conveniently, such a planar magnetic flux generator may be arranged parallel to e.g. one or more flat electrochemical cells, e.g. pouch or prismatic, for enhancement of ion transport. Alternatively, a respective electrochemical cell (e.g. cylindrical) may be arranged above (i.e. spaced from and in the vicinity of) each or some of the magnetic field sources to achieve the same advantageous effect.

Optionally, the magnetic flux generator is integrated inside an electrochemical cell. For example, when the electrochemical cell is a flat cell (e.g. pouch or prismatic), the magnetic field sources may be arranged between layers of the electrochemical cell (e.g. between its electrodes and within its electrolyte), or on an inner wall of the cell housing enclosing the electrodes and electrolyte of the electrochemical cell.

Conveniently, integrating the magnetic flux generator inside an electrochemical cell can ensure that the cell is uniformly permeated by the total changing magnetic field generated by the magnetic flux generator. This can optimise the enhancement of ion transport within the cell.

Optionally, the magnetic flux generator is curved to at least partially surround an electrochemical cell. That is, the magnetic field sources are arranged around a curve, arc, circle, or a polygon to provide the curved shape of the magnetic flux generator. The curve, arc, circle, or polygon may be respectively provided by a curved, semi-circular, circular, or polygonal mechanical support. Conveniently such an arrangement allows the curved flux generator to at least partially surround an electrochemical cell, such as a cylindrical electrochemical cell. For example, the magnetic field source may comprise an octagonal mechanical support, and the magnetic field sources may be arranged on respective inner faces of the octagonal support to provide a central empty space, e.g. for reception of a cylindrical electrochemical cell. Conveniently, this can ensure that the electrochemical cell received within the central empty space of the magnetic flux generator is uniformly permeated by the total changing magnetic field.

The choice of magnet providing the magnetic field source(s) is not particularly limited inasmuch each magnetic field source can produce a respective magnetic field which is individually controllably variable in the three spatial dimensions. For example, at least one of the one or more magnetic field sources may be a temporary magnet.

Optionally, at least one of the one or more magnetic field sources is a permanent magnet coupled to a mechanism for moving the permanent magnet. Generally, the magnetic field produced by a permanent magnet may be varied by varying the direction and/or speed at which the permanent magnet is moved by the respective mechanism. To completely "switch off" the transient nature of a permanent magnet, it is kept static.

Optionally, at least one of the one or more magnetic field sources is an electromagnet. The electromagnet may be any type of electromagnet. The electromagnet generally comprises a coil of wire wound around a core. For example, the core may be a metal core (e.g. a ferromagnetic core), or it may be an air-filled space at the centre of the electromagnet, i.e. an air core. Each electromagnet is configured to be coupled to an electrical power source. Controlling each electromagnet may involve varying the amount of electrical power and/or the direction of the electrical current supplied thereto by the electrical power source. For example, it may be desirable to switch one or more of the electromagnets off (i.e. supply no power to them) to vary the total changing magnetic field. Additionally, or alternatively, it may be desirable to provide electrical current having different directions to respective different electromagnets to vary the magnetic polarity of the respective generated magnetic fields.

Optionally, each electromagnet is an air-core electromagnet. By air-core electromagnet, here it is a meant a coil of wire (i.e. solenoid) which comprises a central air-filled space defined by the coil and does not comprise a solid core, such as a ferromagnetic core. When the one or more magnetic field sources is a plurality of magnetic field sources, the magnetic flux generator may be provided by stacking the plurality of air-core electromagnets to provide a shared air core common to all air-core electromagnets. The air core/the shared air core may accommodate an electrochemical cell, e.g. a cylindrical cell.

When the electrochemical cell is cylindrical and each magnetic field source is an electromagnet, then the magnetic flux generator may be integrated inside the cell by winding each electromagnet around and/or through layers (e.g. electrodes and/or electrolyte) of the cylindrical electrochemical cell.

Optionally, the magnetic flux generator further comprises a controller configured to control each of the three spatial dimensions of each magnetic field. For example, the magnetic flux generator may be configured to select a value for each of the three spatial dimensions of each magnetic field. Additionally, the controller may be configured to select a value for any one or any combination of the polarity, magnitude, phase, amplitude, and/or frequency of the/each magnetic field. The controller may be configured to control each magnetic field (e.g. by selecting a value for each of the three spatial dimensions and optionally, for the polarity and/or magnitude and/or phase and/or amplitude, and/or frequency of each magnetic field) based on any one of or any combination of electric, magnetic, optical, and/or acoustic measurements performed on one or more electrochemical cells located within at least one of the one or more magnetic fields. The electric, magnetic, optical, and/or acoustic measurements may be performed as each magnetic field is individually controllably varied in three spatial dimensions.

The magnetic flux generator may comprise a sensor unit configured to perform the electric, magnetic, optical, and/or acoustic measurements. For example, the sensor unit may comprise any one or any combination of Hall, Gauss, optical, and/or acoustic sensors. The controller may be communicatively connected to the sensor unit.

Optionally, the controller may be configured to monitor electrochemical overpotential of each of one or more electrochemical cells located within at least one of the one or more magnetic fields as each of the one or more magnetic fields is individually controllably varied. The controller may be configured to select an optimal value for each of the three spatial dimensions of each magnetic field to minimize each electrochemical overpotential. The monitoring may be discrete or continuous. Additionally, the controller may select an optimal value for any one or any combination of the polarity, magnitude, phase, amplitude, and/or frequency of each magnetic field to minimize the electrochemical overpotential. The controller may repeat the monitoring of each electrochemical overpotential and the selection of optimal values as many times as required to minimize each electrochemical overpotential.

Optionally, the controller is configured to monitor each electrochemical overpotential via direct overpotential measurements. The direct overpotential measurements may be performed for example using electrochemical impedance spectroscopy (with impedance measurements at multiple frequencies or fixed-frequency impedance). Alternatively, any one or any combination of the amplitude, phase shift, and frequency of the/each cell's electrochemical potential or electrical current may be measured to monitor the electrochemical overpotential.

Optionally, the controller is configured to monitor each electrochemical overpotential using any one of or any combination of electric, magnetic, optical, acoustic measurements performed on the one or more electrochemical cells. For example, such measurements may be used as a proxy for determining the electrochemical overpotential of each electrochemical cell.

Optionally, the controller is electrically connected to both the magnetic flux generator and to the one or more electrochemical cells. This can allow the controller to directly monitor each electrochemical overpotential as well as to control the one or more magnetic field sources to individually controllably vary their respective magnetic fields.

When the controller is configured to monitor each electrochemical overpotential using any one of or any combination of electric, magnetic, optical, acoustic measurements performed on the one or more electrochemical cells, the controller may be electrically connected to both the magnetic flux generator and to the one or more electrochemical cells, and additionally communicatively connected to the sensor unit configured to perform the electric, magnetic, optical, and/or acoustic measurements. For example, the sensor unit may comprise any one or any combination of Hall, Gauss, optical, and/or acoustic sensors. This is because electric, magnetic, optical, acoustic measurements can be indicative of the state of charge/health of an electrochemical cell. For example, the optical sensors may be configured to measure deformation and/or build-up/loss of material at selected locations on the one or more electrochemical cells. The acoustic sensors may be configured to measure decibel response to acoustic signals transmitted to/reflected from one or more selected locations on the one or more electrochemical cells. Conveniently, the decibel response correlates to the state of charge at a selected location on the one or more electrochemical cells.

SUMMARY OF THE FIGURES

Embodiments and experiments illustrating the principles of the invention will now be discussed with reference to the accompanying figures in which:

FIGS. 7A-7B schematically show variants of a magnetic flux generator according to an embodiment of the present invention which is integrated inside a cylindrical electrochemical cell.

DETAILED DESCRIPTION OF THE INVENTION

Aspects and embodiments of the present invention will now be discussed with reference to the accompanying figures. Further aspects and embodiments will be apparent to those skilled in the art. All documents mentioned in this text are incorporated herein by reference.

Figure 1A:
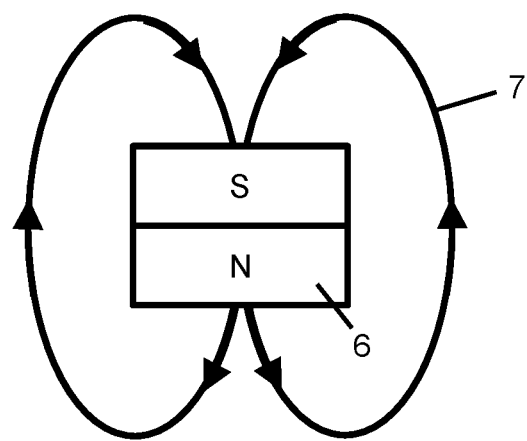
FIGS. 1A-1B schematically show the magnetic field generated by two different magnetic field source configurations.
Figure 1B:
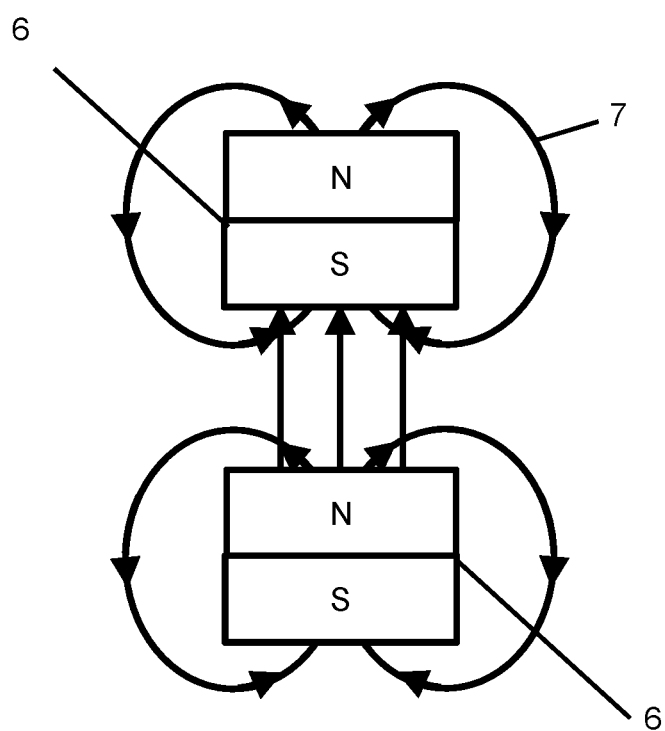

Generally, a magnetic field source, such as a permanent magnet, a temporary magnet or an electromagnet produces a field which can be represented by magnetic field lines. This physical phenomenon is discussed with respect to FIGS. 1A-1B. Specifically, FIG. 1A shows a magnetic field source 6 having a south pole S and a north pole N which produces a magnetic field represented by magnetic field lines 7. Similarly, FIG. 1B shows two magnetic field sources 6 of the type of FIG. 1A arranged such that the south pole S of the first magnetic field source is proximal the north pole N of the second magnetic field source. This arrangement of magnetic field sources 6 produces a total magnetic field which is represented by respective magnetic field lines 7. Thus, the magnetic fields produced by magnetic field sources which are sufficiently close in space, interact with one another and thus produce a total magnetic field. The present invention relies at least in part on this phenomenon.

The present invention provides a magnetic flux generator comprising one or more magnetic field sources, each being configured to produce a respective magnetic field which is individually controllably variable in three spatial dimensions. The magnetic flux generator generates a total changing magnetic field which is provided by the one or more magnetic fields together. Each magnetic field may be individually controllably varied over time continuously or incrementally over time.

Figure 2:
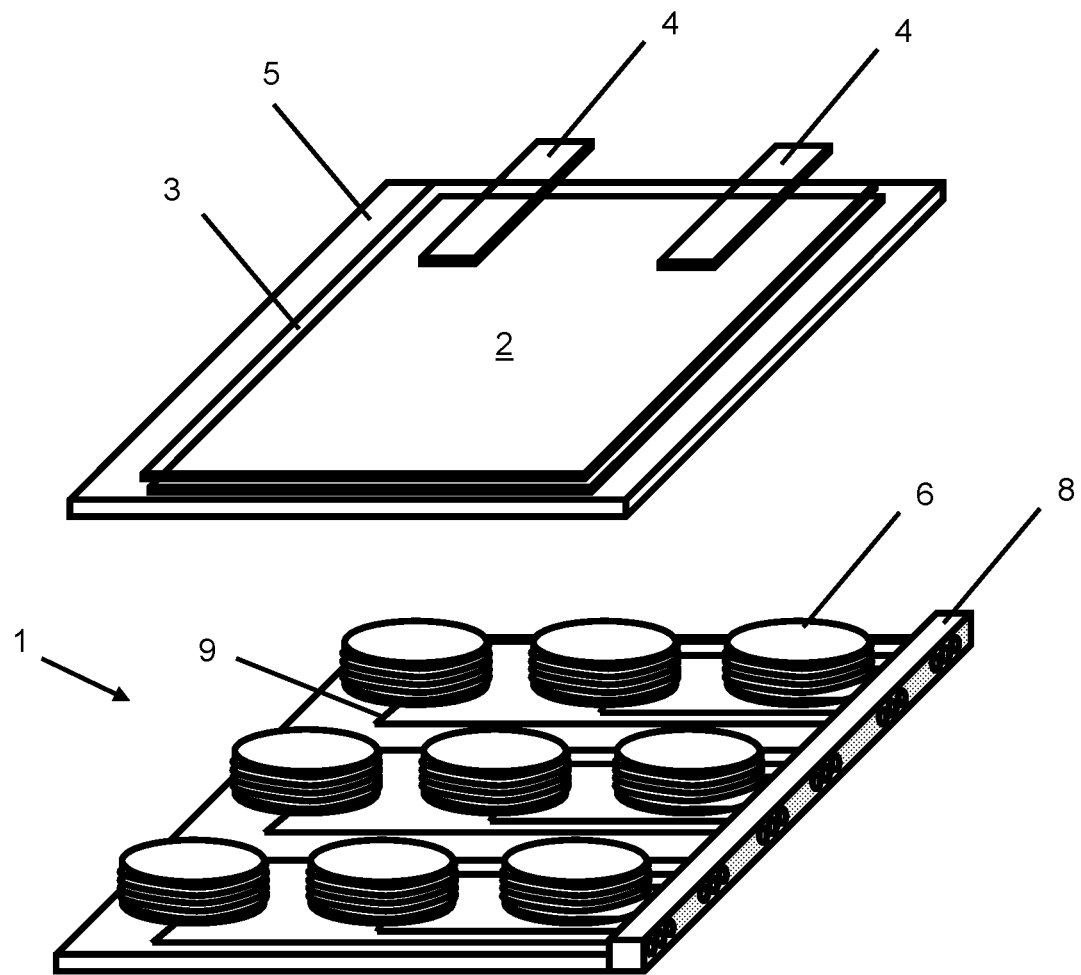
FIG. 2 schematically shows a magnetic flux generator according to an embodiment of the present invention, and a flat electrochemical cell.

A first embodiment of the invention is discussed with reference to FIG. 2. FIG. 2 schematically shows a magnetic flux generator 1 and a flat electrochemical cell 2. The magnetic flux generator 1 comprises a plurality of magnetic field sources 6 which are arranged in a common plane and supported by a planar (i.e. flat) mechanical support 8. The magnetic field sources 6 are arranged in a grid, but other arrangements are also possible.

In this example, the plurality of magnetic fields sources 6 is a plurality of electromagnets. Each electromagnet comprises a coil of wire wound around a core (e.g. a metal core, such as a ferromagnetic core, or an air core provided by an air-filled space at the centre of the electromagnet). Each electromagnet 6 is configured to be coupled to an electrical power source (not shown) via electrical connections 9 to generate its respective magnetic field. Controlling each electromagnet may involve varying the amount of electrical power and/or the direction of the electrical current supplied thereto by the electrical power source. For example, it may be desirable to switch one or more of the electromagnets off (i.e. supply no power to them) to vary the total changing magnetic field generated by the magnetic flux generator 1. Additionally, or alternatively, it may be desirable to provide electrical current having different directions to respective different electromagnets to vary the magnetic polarity (i.e. north N or south S) of the respective generated magnetic fields.

The electrochemical cell 2 is a flat electrochemical cell which may be a prismatic cell or a pouch cell. In this example, the flat electrochemical cell is a pouch cell comprising a housing 5 (whose floor is shown in FIG. 2), a pair of electrodes 13 defining a current flow path and spaced by electrolyte 12, and a pair of tabs 4. The electrodes 13 and the electrolyte 12 (shown, e.g. in FIGS. 6A and 6B) together form an electrode assembly 3. The electrochemical cell 2 is arranged in spatial proximity to the magnetic flux generator 1 such that it is permeated by at least one of the magnetic fields generated by the plurality of magnetic field sources 6. Specifically, in this example, the cell 2 overlies (i.e. it is parallel to and spaced from) the magnetic flux generator 1.

Figure 3:
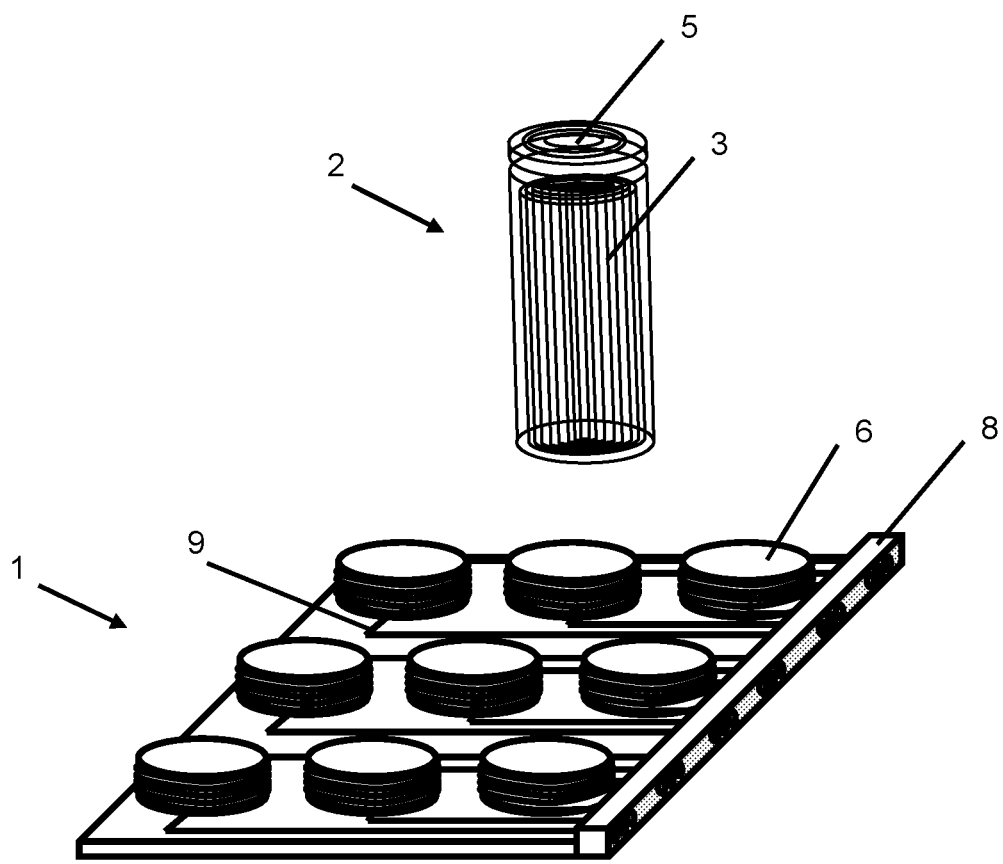
FIG. 3 schematically shows the magnetic flux generator of FIG. 1, and a cylindrical electrochemical cell.

The magnetic flux generator 1 of FIG. 1 may be used with different types of electrochemical cell, in addition to pouch and prismatic. For example, the magnetic flux generator may be used with coin cells as well as cylindrical cells to enhance their ion transport. This is shown in FIG. 3 where the magnetic flux generator 1 is arranged in close spatial proximity to a cylindrical cell 2. The cylindrical cell is positioned above the magnetic flux generator such that it is permeated by at least one of the magnetic fields generated by the plurality of magnetic field sources 6. As before, the cylindrical cell 2 comprises an electrode assembly 3 enclosed within a housing 5.

Figure 4:
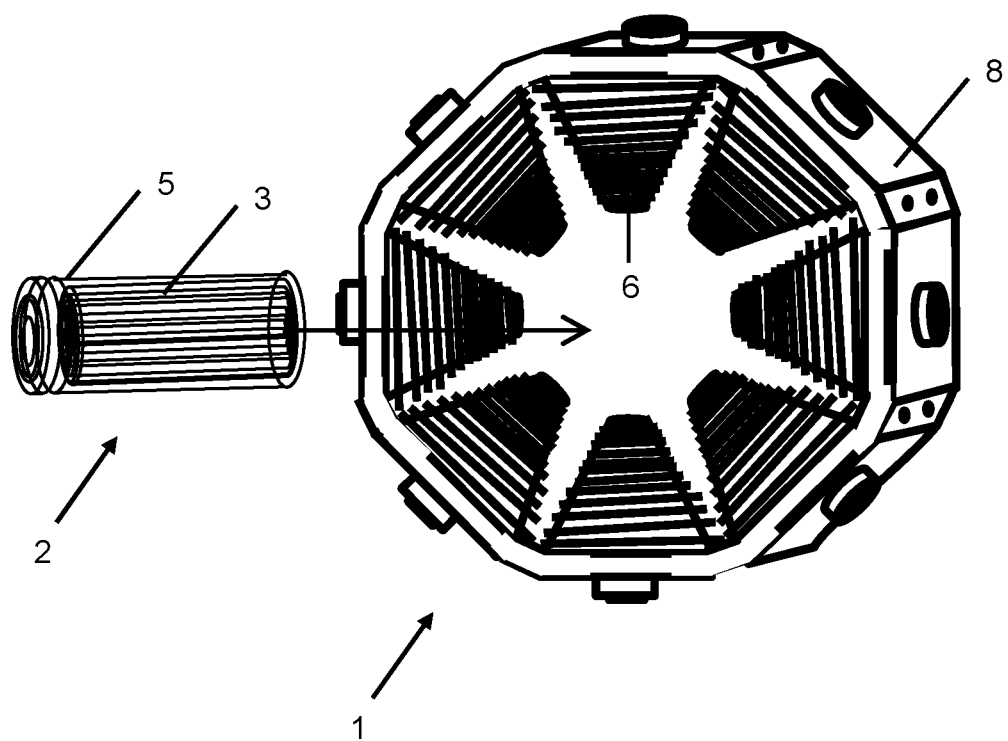
FIG. 4 schematically shows a magnetic flux generator according to an embodiment of the present invention, and a cylindrical electrochemical cell.

The plurality of magnetic field sources 6 may be arranged on differently shaped mechanical supports 8, not just planar. For example, the mechanical support 8 may be curved, semi-circular, circular, or polygonal. Thus, the magnetic field sources may be arranged around a curve, arc, circle, or a polygon. Such a magnetic flux generator 1 is referred to as a curved magnetic flux generator and exemplified by the embodiment shown in FIG. 4. In this example, the mechanical support 8 is octagonal and the magnetic field sources 6 are arranged on respective inner faces of the octagonal support to provide a central empty space. This central empty space is for reception of an electrochemical cell, as shown in FIG. 4 where a cylindrical electrochemical cell 2 is inserted. Conveniently, this can ensure that the electrochemical cell 2 received within the central empty space is uniformly permeated by the total changing magnetic field generated by the magnetic flux generator 1.

Figure 5A:
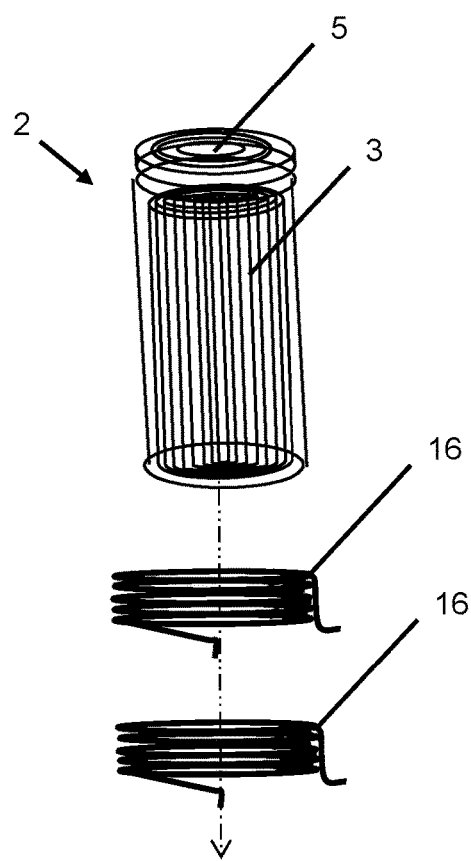
FIGS. 5A-5B schematically show a magnetic flux generator according to an embodiment of the present invention and a cylindrical electrochemical cell in two respective configurations.

When each magnetic field source 6 is an air-core electromagnet 16 (i.e. a coil of wire (solenoid) comprising a central air-filled space defined by the coil and not comprising a solid core), the magnetic flux generator 1 may be provided by stacking the plurality of air-core electromagnets 16 to provide a shared air core common to all air-core electromagnets. This is shown in FIG. 5A. The shared air core can accommodate an electrochemical cell. For example, a cylindrical electrochemical cell 2 can be inserted into the shared air core as shown in FIG. 5A to obtain the arrangement shown in FIG. 5B. Thus, the magnetic flux generator 1 at least partially surrounds the electrochemical cell 2.

As discussed with reference to FIGS. 2-5B above, the magnetic flux generator 1 can be arranged in spatial proximity to an electrochemical cell 2 and externally to it. However, it is also possible that the magnetic flux generator is integrated inside an electrochemical cell. Examples of this are discussed with reference to FIGS. 6A-7B.

Figure 6A:
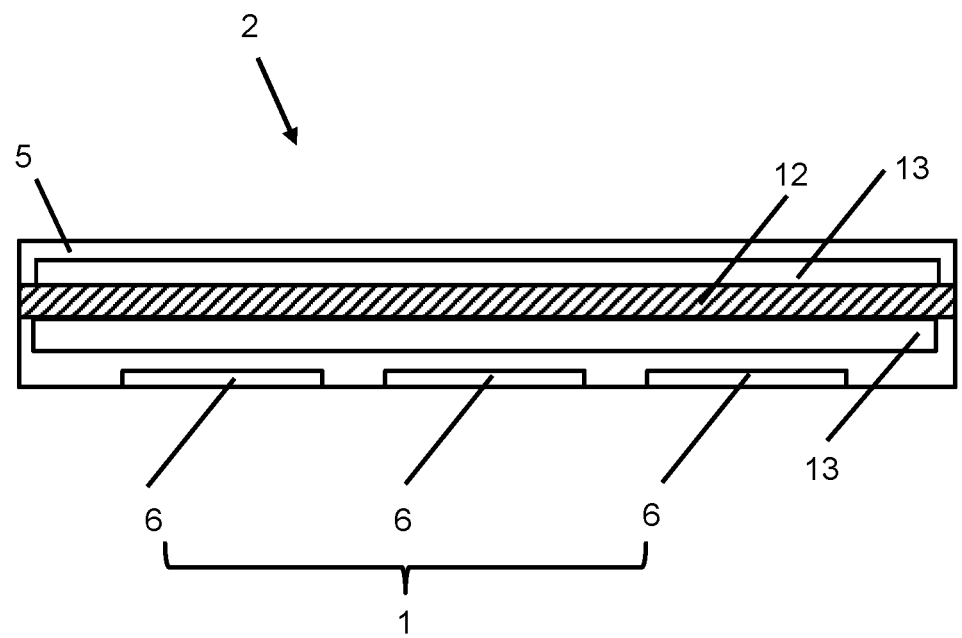
FIGS. 6A-6B schematically show variants of a magnetic flux generator according to an embodiment of the present invention which is integrated inside a flat electrochemical cell.
Figure 6B:
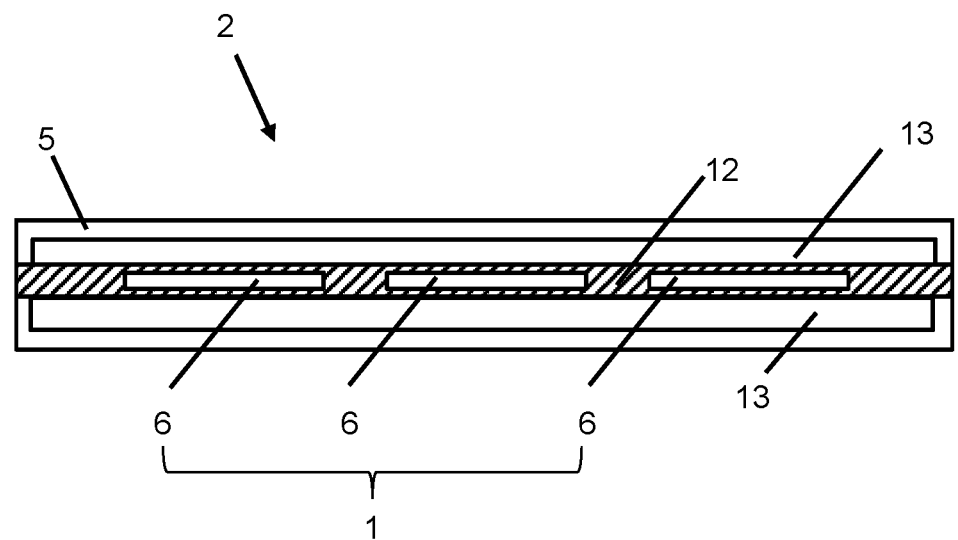

In both FIGS. 6A and 6B, the magnetic flux generator 1 comprises a plurality of magnetic field sources 6 (three of which are shown) integrated inside a flat electrochemical cell 2 (e.g. pouch or prismatic). In the example of FIG. 6A, the magnetic field sources 6 are arranged on an inner wall of the cell housing 5 enclosing the electrodes 13 and electrolyte 12 of the electrochemical cell 2. In contrast, in FIG. 6B, the magnetic field sources 6 are arranged between layers of the electrochemical cell 2, i.e. between the electrodes 13 and within the electrolyte 12.

Alternatively, the magnetic flux generator 1 may be integrated inside a non-planar electrochemical cell such as a cylindrical cell. This is shown in FIGS. 7A and 7B. In the variant of FIG. 7A, the magnetic flux generator 1 comprises a single magnetic field source 6 which is a permanent magnet 17 coupled to a mechanism (not shown) for moving the permanent magnet. The permanent magnet 17 is shown outside the cell, at the bottom of FIG. 7A, for reference. In the embodiment, the magnetic field source 6 (i.e. the permanent magnet 17 coupled to its mechanism) is integrated inside the cell 2, on an inner wall of the cell housing 5, such that the magnetic field source 6 longitudinally spaces the inner wall of the cell housing from the electrode assembly 3. As discussed before, the choice of magnetic field source 6 is not particularly restricted and, in addition to a permanent magnet, the magnetic field source may be an electromagnet, or a temporary magnet.

Figure 5B:
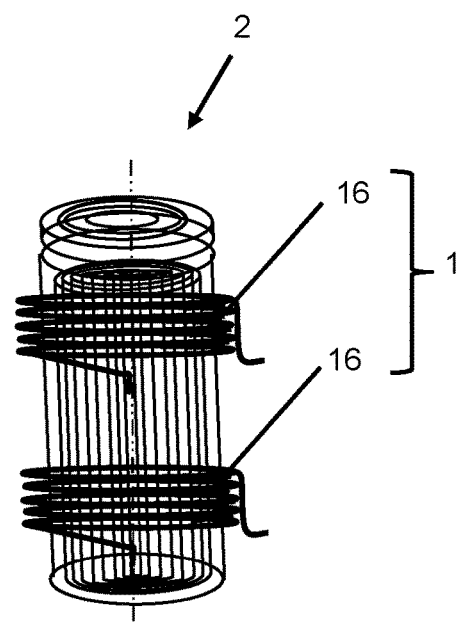

Indeed, FIG. 7B shows an alternative arrangement where the magnetic flux generator 1 is provided by a plurality of air-core electromagnets 16 stacked to provide a shared air core as in the example of FIGS. 5A-5B. An example of a single air-core electromagnet 16 is shown for reference under the electrochemical cell, at the bottom of FIG. 7B. The air-core electromagnets 16 are each wound around and/or through layers (e.g. the electrode assembly 3) of the cylindrical electrochemical cell 2.

Modifications to the above embodiments are possible. The choice of magnet providing the magnetic field source(s) is not particularly limited inasmuch each magnetic field source can produce a respective magnetic field which is individually controllably variable in the three spatial dimensions. The electrochemical cell may be a battery. The battery may be a positive ion battery and the current flow path may be the direction of travel of positive ions. The battery may be a lithium-ion battery. Alternatively, the battery may be a negative ion battery and the current flow path may be the direction of travel of negative ions. The cell may be for powering an electric vehicle, a mobile phone, a laptop computer, tablet or other portable or stationary device. The electrochemical cell may be a fuel cell.

As discussed above, each magnetic field source of the present invention is configured to produce a respective magnetic field which is individually controllably variable in the three spatial dimensions. This is to allow the total changing magnetic field generated by the magnetic flux generator to be reliably varied.

Figure 8A:
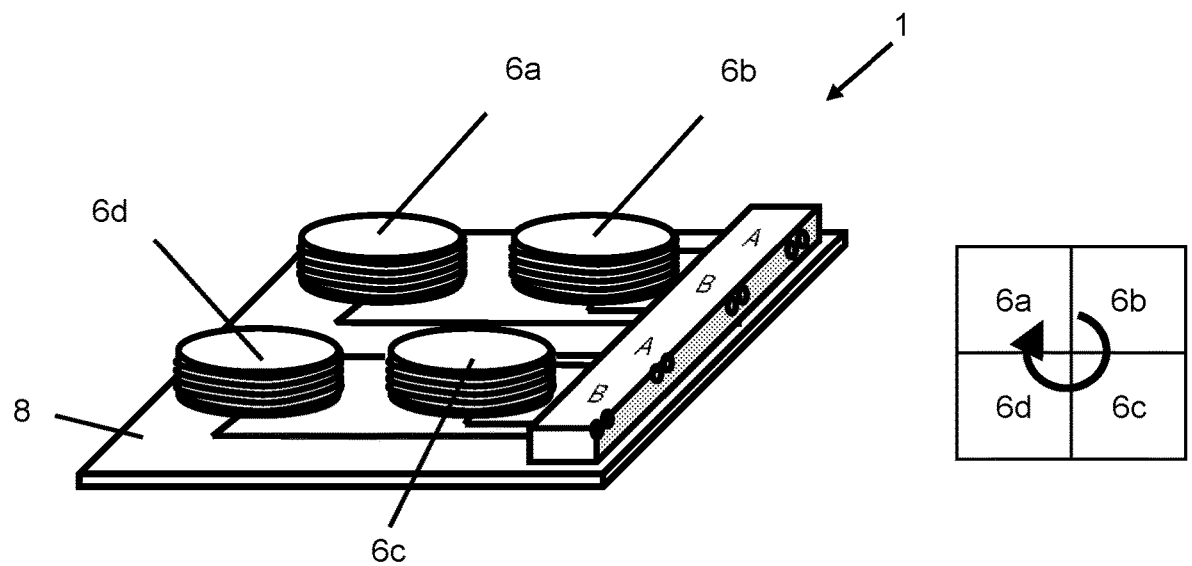
FIG. 8A schematically shows a perspective view of a magnetic flux generator of the type shown in FIGS. 2 and 3 and a simplified top view of the magnetic flux generator.

An example of individually controllably varying each of four magnetic fields in the three spatial dimensions is discussed with reference to FIGS. 8A and 8B. The magnetic flux generator 1 is shown in FIG. 8A and comprises four magnetic field sources 6a, 6b, 6c, 6d in a 2×2 grid arrangement on a planar mechanical support 8. The schematic top view of the magnetic flux generator is shown on the right-hand side of FIG. 8A, showing a 2×2 grid with the four magnetic field sources 6a, 6b, 6c, 6d. It is possible to vary the total changing magnetic field produced by the magnetic flux generator 1 by individually and controllably varying each magnetic field produced by a respective magnetic field source 6a, 6b, 6c, 6d.

Figure 8B:
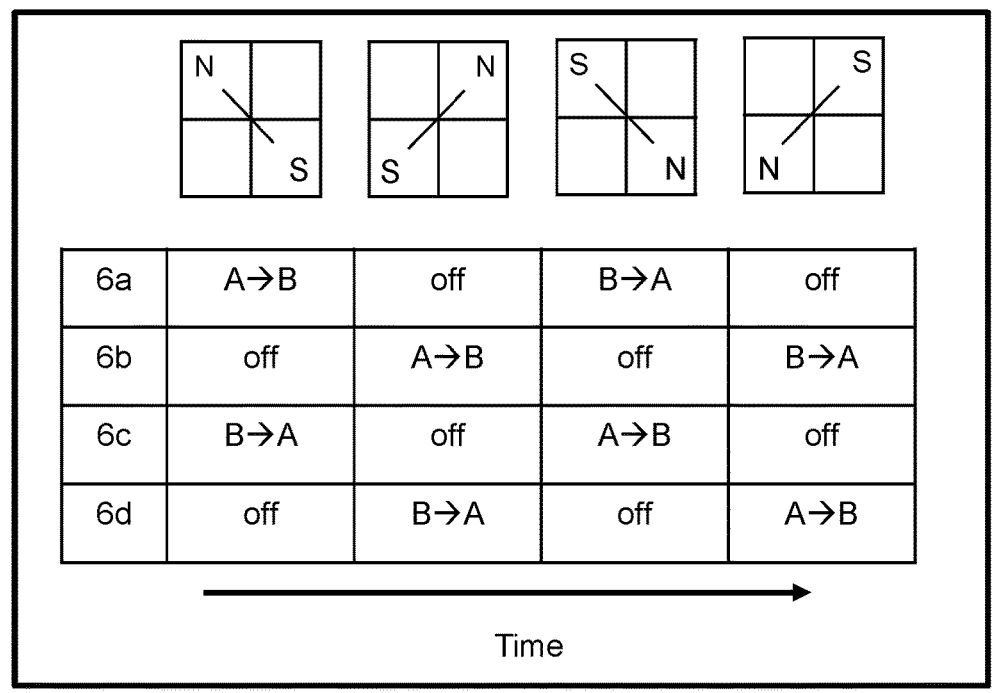
FIG. 8B shows a method of controlling the total changing magnetic field generated by the magnetic flux generator over time by sequentially operating individual magnetic field sources.

FIG. 8B shows how to achieve a circularly rotating total changing magnetic field in the clockwise direction (shown in the simplified grid of FIG. 8A) by sequentially controlling the four magnetic field sources. Specifically, each of the four magnetic field sources is controlled to either have a predetermined polarity (south S or north N) which can be reversed/alternated, or to be completely switched off. Generally, when the magnetic field sources are permanent magnets, they can be moved to a particular orientation (e.g. rotated in a particular direction) to control their polarity, or kept stationary to switch them off. In the example of FIGS. 8A and 8B, the magnetic field sources 6a, 6b, 6c, 6d are electromagnets. Thus, in FIG. 8A, each electromagnet is either switched off by not supplying any electrical power to it, or its polarity is varied between N and S by supplying electrical current having a specifically selected direction. That is, supplying current via the electrical connections 9 in a direction from A to B or B to A, (see FIG. 8A) results is either a north N or south S polarity on the surface of the array.

Figures 9A, 9B, 9C, 9D, 9E:
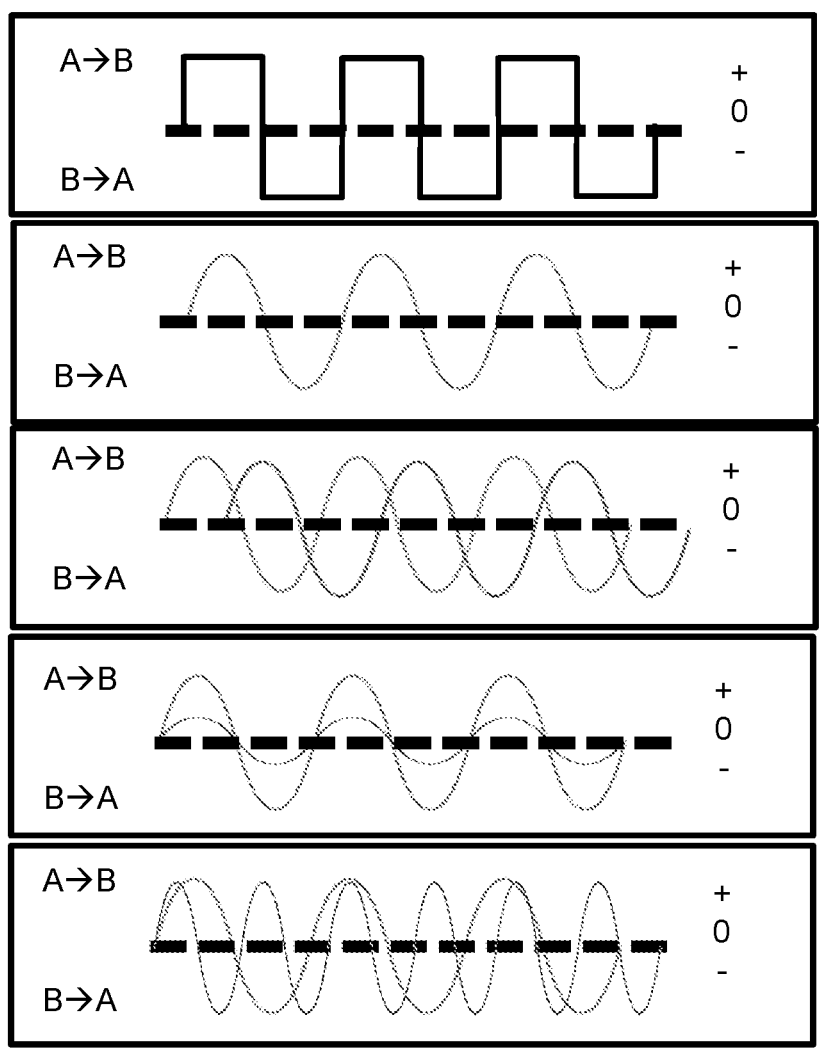
FIGS. 9A-9E show functions of electrical currents supplied to respective magnetic field sources over time.

The polarity N, S of each magnetic field source 6a, 6b, 6c, 6d may be varied in a step-like manner as shown in FIG. 8B or alternatively it may be varied gradually over time. FIGS. 9A-9E illustrate this by showing time-evolving example electrical current functions representing electrical currents supplied to different magnetic field sources. FIG. 9A shows an electrical current function evolving in a step-like manner over time. In contrast, FIGS. 9B-9E show electrical current functions having a sine form and evolving gradually over time. In the examples of FIGS. 9C-9E, the total electrical current supplied to magnetic flux generator 1 is represented by a superposition of multiple electrical current functions, e.g. two sine waves out-of-phase, and/or of different amplitude, and/or of different frequency. The superposition of multiple electric current functions (each corresponding to a respective magnetic field source) may be said to generate a "magnetic field signature" of the total changing magnetic field generated by the magnetic flux generator 1.

Figure 10:
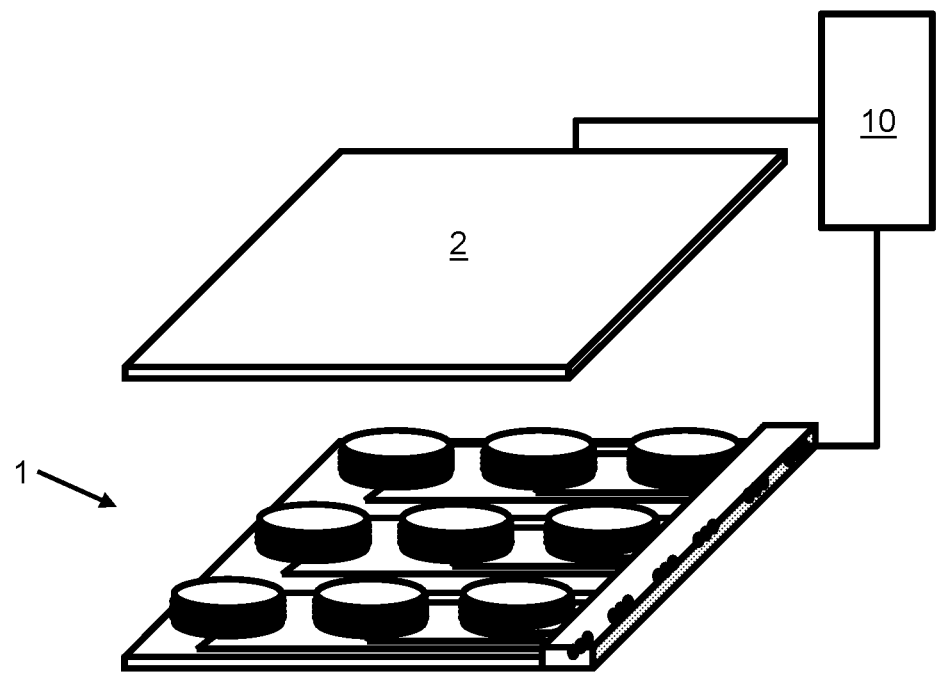
FIG. 10 schematically shows a magnetic flux generator, an electrochemical cell, and a controller.
Figure 11:
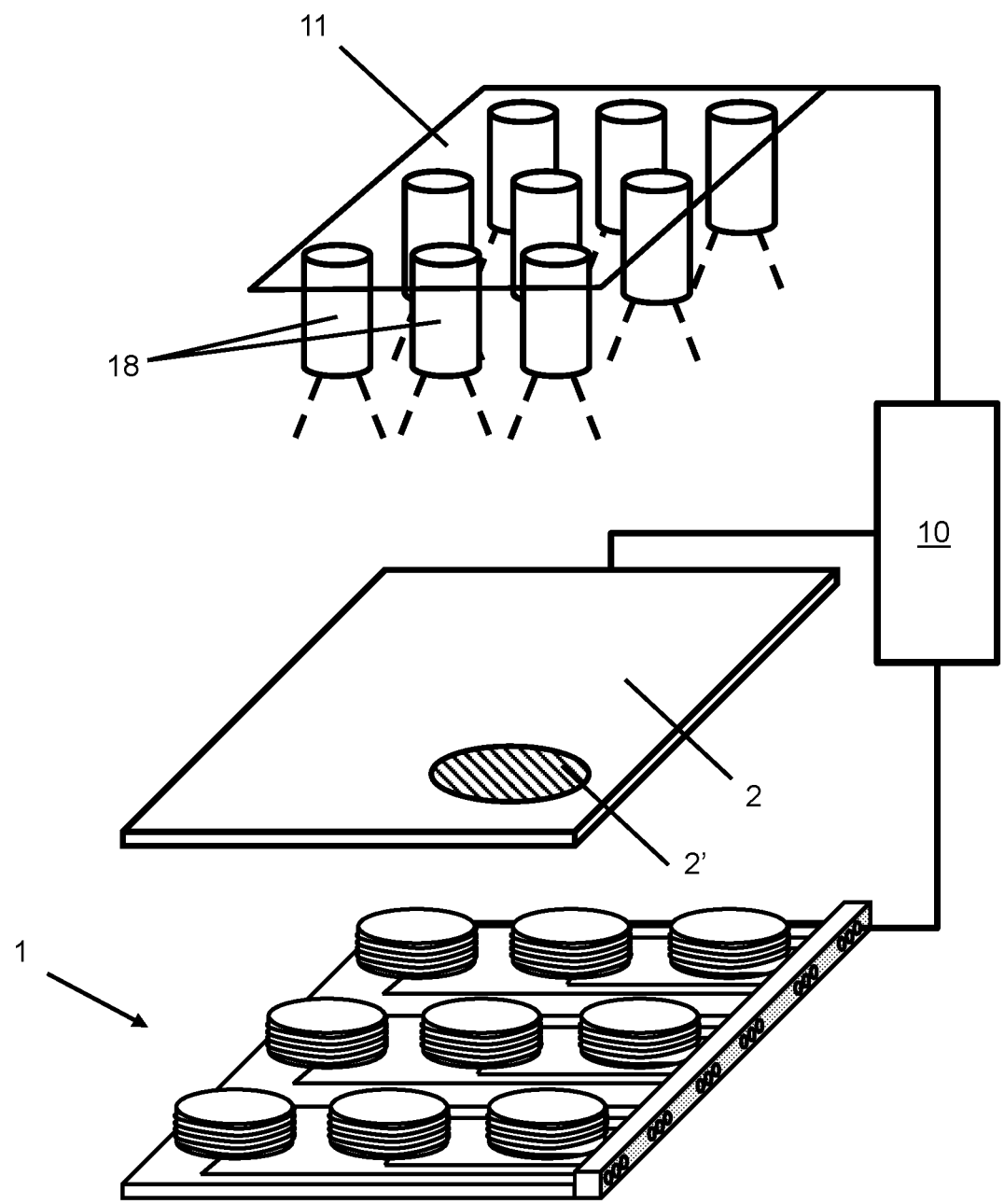
FIG. 11 schematically shows a variant of the configuration of FIG. 10 further comprising a sensor unit.

The magnetic field produced by each magnetic field source may be individually and controllably varied by a controller 10 comprised by the magnetic flux generator 1. This is shown in FIGS. 10 and 11. In FIG. 10, the controller is electrically connected to the magnetic flux generator 1 and an electrochemical cell 2 located within at least one of the magnetic fields generated by the magnetic field sources.

In the examples of FIGS. 10 and 11, the electrochemical cell 2 is a flat cell overlying the magnetic flux generator 1. The controller 10 is configured to monitor electrochemical overpotential of the electrochemical cell as each of the magnetic fields is individually controllably varied (e.g. as discussed with reference to FIGS. 8A-9E). The controller 10 is further configured to select an optimal value for each of the three spatial dimensions of each magnetic field to minimize the electrochemical overpotential. Optionally, the controller may also select an optimal value for any one or any combination of the polarity, magnitude, phase, amplitude, and/or frequency of each magnetic field to minimize the electrochemical overpotential. The controller 10 may repeat the monitoring of electrochemical overpotential and the selection of optimal values as many times as required to minimize the electrochemical overpotential. The optimal parameters selected for each magnetic field need not be identical. Indeed, the controller may select different optimal parameter values for each magnetic field as this can help improve the homogeneity of ion transport enhancement across the electrochemical cell.

The controller 10 of the example shown in FIG. 10 is configured to monitor each electrochemical overpotential via direct overpotential measurements. The direct overpotential measurements may be performed for example using electrochemical impedance spectroscopy. Alternatively, any one or any combination of the amplitude, phase shift, and frequency of the cell's electrochemical potential or electrical current may be measured to monitor the electrochemical overpotential. The controller 10 can measure these via its electrical connection to the electrochemical cell 2.

Alternatively, the electrochemical overpotential of the electrochemical cell 2 may be monitored using any one of or any combination of electric, magnetic, optical, acoustic measurements performed on the cell. These measurements can act as a proxy for determining the electrochemical overpotential. A corresponding variant arrangement is shown in FIG. 11 where the controller 10 is further communicatively and/or electrically connected to a sensor unit 11 comprising a plurality of sensors 18. The plurality of sensors 18 maybe include any one or any combination of Hall sensors, Gauss sensors, optical sensors (e.g. measuring deformation and/or build-up/loss of material at selected locations on the electrochemical cell 2), and/or acoustic sensors (e.g. measuring decibel response to acoustic signals transmitted to/reflected from selected locations on the electrochemical cell 2). FIG. 11 further shows an area 2' on the electrochemical cell 2 which is performing differently to the rest of the cell, e.g. it is underperforming. Thus, the controller 10 can detect this discrepancy in performance via the overpotential measurements and set the optimal parameter values for a specific magnetic field source/a group of magnetic field sources whose magnetic field(s) permeate the underperforming region 2', to account for the local lower performance, thereby homogenising the macroscopic (overall) cell performance across its volume.

The features disclosed in the foregoing description, or in the following claims, or in the accompanying drawings, expressed in their specific forms or in terms of a means for performing the disclosed function, or a method or process for obtaining the disclosed results, as appropriate, may separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

The invention claimed is:

1. A magnetic flux generator to enhance ion transport in one or more electrochemical cells, the magnetic flux generator comprising:
one or more magnetic field sources, each being configured to produce a respective changing magnetic field through the one or more electrochemical cells;
wherein each changing magnetic field is individually controllably variable in three spatial dimensions to enhance the ion transport in the one or more electrochemical cells; and
a controller electrically connected to the one or more magnetic field sources and to the one or more electrochemical cells, the controller configured to:
monitor electrochemical overpotential of each of the one or more electrochemical cells located within at least one of the one or more magnetic fields as each of the one or more magnetic fields is individually controllably varied; and
select a value for each of the three spatial dimensions of each magnetic field to reduce each electrochemical overpotential.

2. The magnetic flux generator of claim 1 wherein the controller is configured to monitor each electrochemical overpotential via direct overpotential measurements.

3. The magnetic flux generator of claim 1 wherein the controller is configured to monitor each electrochemical overpotential using any one of or any combination of electric, magnetic, optical, acoustic measurements performed on the one or more electrochemical cells.

4. The magnetic flux generator of claim 3 wherein the controller is:
communicatively connected to a sensor unit configured to perform the electric, magnetic, optical, and/or acoustic measurements.

5. The magnetic flux generator of claim 1 wherein each magnetic field is individually controllably varied over time continuously or incrementally.

6. The magnetic flux generator of claim 1 wherein each magnetic field is individually controllably varied to be pulsed, rotating, and/or oscillating.

7. The magnetic flux generator of claim 1 wherein the one or more magnetic field sources is a plurality of magnetic field sources.

8. The magnetic flux generator of claim 7 wherein the plurality of magnetic field sources are arranged in a common plane.

9. The magnetic flux generator of claim 8 comprising a planar mechanical support configured to support the plurality of magnetic field sources.

10. The magnetic flux generator of claim 1 wherein the magnetic flux generator is integrated inside an electrochemical cell of the one or more electrochemical cells.

11. The magnetic flux generator of claim 9 wherein the magnetic flux generator is curved to at least partially surround an electrochemical cell of the one or more electrochemical cells.

12. The magnetic flux generator of claim 1 wherein at least one of the one or more magnetic field sources is a permanent magnet coupled to a mechanism for moving the permanent magnet.

13. The magnetic flux generator of claim 1 wherein at least one of the one or more magnetic field sources is an electromagnet.

14. The magnetic flux generator of claim 13 wherein each electromagnet is an air- core electromagnet.

15. A magnetic flux generator to enhance ion transport in one or more electrochemical cells, the magnetic flux generator comprising:
one or more magnetic field sources, each being configured to produce a respective changing magnetic field through the one or more electrochemical cells, wherein each changing magnetic field is individually controllably variable in three spatial dimensions to enhance the ion transport in the one or more electrochemical cells; and a controller electrically connected to the one or more magnetic field sources and to the one or more electrochemical cells and configured to control each of the three spatial dimensions of each magnetic field based on one or more of electric, magnetic, optical, and/or acoustic measurements performed on the one or more electrochemical cells located within at least one of the one or more magnetic fields;
the controller being further configured to:
monitor electrochemical overpotential of each of the one or more electrochemical cells located within at least one of the one or more magnetic fields as each of the one or more magnetic fields is individually controllably varied; and
select a value for each of the three spatial dimensions of each magnetic field to reduce each electrochemical overpotential.

* * * * *